(12) United States Patent
Bogoslofski et al.

(10) Patent No.: US 8,336,747 B2
(45) Date of Patent: Dec. 25, 2012

(54) BICYCLE RACK WITH CROSS ORIENTED BICYCLE CRADLE

(75) Inventors: Kevin Bogoslofski, Southington, CT (US); John R. Laverack, Southbury, CT (US)

(73) Assignee: Thule Sweden AB (SE)

( * ) Notice: Subject to any disclaimer, the term of this patent is extended or adjusted under 35 U.S.C. 154(b) by 165 days.

(21) Appl. No.: 13/028,009

(22) Filed: Feb. 15, 2011

(65) Prior Publication Data

US 2012/0205414 A1 Aug. 16, 2012

(51) Int. Cl.
*B60R 11/00* (2006.01)

(52) U.S. Cl. ........ 224/534; 224/537; 224/568; 224/571; 224/924

(58) Field of Classification Search .......... 224/534–537, 224/568, 571, 924
See application file for complete search history.

(56) References Cited

U.S. PATENT DOCUMENTS

| | | | |
|---|---|---|---|
| 7,404,504 B2 * | 7/2008 | Settelmayer | 224/497 |
| 7,757,917 B2 | 7/2010 | Bogoslofski et al. | |
| D625,247 S * | 10/2010 | Flaherty et al. | D12/408 |
| 8,025,196 B2 | 9/2011 | Flaherty et al. | |
| 2007/0235487 A1 * | 10/2007 | Bogoslofski et al. | 224/533 |

* cited by examiner

*Primary Examiner* — Justin Larson
*Assistant Examiner* — Adam Waggenspack
(74) *Attorney, Agent, or Firm* — Novak Druce + Quigg LLP (57) ABSTRACT

A bicycle rack includes at least one arm and a cradle installed on the arm for receiving a bicycle thereon. The cradle has a body including a through-hole extending through the longitudinal length of the body. The through-hole is sized to be received by the arm of a bicycle rack. A saddle extending along a length of the longitudinal body is positioned above the through-hole and has a top surface for receiving a tube of a bicycle. The saddle is oriented cross-ways to the longitudinal axis of the through-hole. The top surface of the saddle can increase in dimension on one side of a vertical axis of the through-hole and decreases in dimension on the other side of the vertical axis as the saddle extends toward each end of the longitudinal body. A latch is positioned on opposite sides of the vertical axis at either end of the saddle.

18 Claims, 7 Drawing Sheets

BICYCLE RACK WITH CROSS ORIENTED BICYCLE CRADLE

TECHNICAL FIELD

The present disclosure generally relates to a cradle for supporting a load. In particular, the present disclosure is directed to a cradle that can be installed on a load carrier, e.g., a rack arm of a bicycle rack, such that the load can be readily and sufficiently secured to the load carrier. Further, the disclosure is directed to a cradle having a generally U-shaped saddles portion that is oriented for receiving a load component thereon. The cradle further includes a void and a strap assembly for securing the cradle to, for example, the load carrier.

BACKGROUND

Sporting good accessories such as rear mounted bicycle racks are known. Generally, such bicycle racks are placed at the rear of a vehicle, for, example by attachment to a trunk or hitch mount. Bicycle racks are generally comprised of a rigid frame with one or more an extension arms projecting in a rearward direction which are capable of carrying one or more bicycles. Various types of bicycle frame are readily attachable and removable from the bicycle rack to promote ease of use for sporting enthusiasts.

The bicycle rack extension arms often include bicycle cradles which are integrated or inserted onto the arms. The cradles are typically positioned for receiving the tube of a bicycle. The cradles often comprise a pliable material to protect the bicycle from dents and scratches and to prevent movement of the bicycle on the rack assembly. Furthermore, straps are often employed and attached to the cradles, which also serves to prevent movement of the bicycle on the rack assembly. Typically, the straps are secured via latches and then wrapped over a tube of the bicycle. This prevents the bicycles from falling off the rack when the vehicle is in motion.

A difficulty arises, however, with the attachment of a strap to the cradle. Latches are provided on the bicycle carrier for enabling attachment of the strap to the cradle. However, when the straps are attached to the latches to secure a bicycle in a cradle, they are typically oriented parallel with a longitudinal axis of the cradle and the rack extension arms. As a result, because a portion of the straps typically extends beyond the latch, when straps are fastened to the latch, the ends of the strap protrudes downward against the rack extension arm. Accordingly, the ends of the strap typically abut and/or are obstructed by the rack extension arm. Such obstruction can make it difficult to fasten and remove the strap from the latch assembly.

SUMMARY OF THE INVENTION

A cradle assembly and method for preventing and minimizing abutment of a straps of the cradle assembly with a component of a load carrier is disclosed. Such a cradle has the effect of causing the strap to protrude to the sides of the rack extension arm rather than projecting directly on top of the rack extension arm. This facilitates the attachment of the strap by a user, avoids obstruction of the straps by the rack extension arm and provides for the more efficient employment of load carrier components.

Disclosed herein is a cross-oriented cradle for a bicycle rack, the cradle having a longitudinal body including a through-hole extending through the longitudinal length of the body, the through-hole being sized to be received by a support assembly (for example the arm of a bicycle rack), a saddle extending along a length of said longitudinal body, being positioned above said through-hole and having a top surface for receiving a tube of a bicycle, the saddle being oriented cross-ways to a longitudinal axis of the through-hole, a latch at each end of the saddle for attachment of a strap thereto, the latches being positioned on opposite sides of a longitudinal axis of the through-hole.

In further embodiments, the opposite ends of the cradle saddle are each has a greater dimensional proportion on one side of the longitudinal axis. Furthermore, the latches at each end of the saddle are positioned an equal distance from the longitudinal axis. Further, the saddle surface increases in dimension equally on opposite sides of the longitudinal axis toward opposite ends of the saddle.

In other embodiments there is disclosed a bicycle rack cradle for receiving and securement of a portion of a bicycle thereon, the cradle including a longitudinal body having a through-hole extending through the longitudinal length of the body, the through-hole being sized to be received by a support assembly (for example, the arm of a bicycle rack), a saddle extending along a length of the longitudinal body, being positioned above the through-hole and having a top surface for receiving a tube of a bicycle, a latch at each end of the saddle for attachment of a strap thereto, the saddle being oriented such that the top surface of the saddle increases in dimension on one side of a vertical axis of the through-hole and decreases in dimension on the other side of the vertical axis as the saddle extends toward each end of the longitudinal body, wherein the latches are positioned on opposite sides of the vertical axis.

In further embodiments, the saddle surface increases in dimension on opposite sides of the vertical axis toward opposite ends of the saddle. Further, wherein said saddle surface increases in dimension on one side of said vertical axis toward a saddle end having a greater area on the same side of said vertical axis. In further embodiments, each saddle end extension extends in a direction away from the vertical axis.

In additional embodiments, the latches at each end of the saddle are positioned an equal distance from the vertical axis. The latches are rotated in a direction toward the vertical axis thereby facilitating attachment of a strap at each end of the saddle. The latches are made up of extensions in the longitudinal direction of the body having a flanged end piece for resistantly fitting a hole of a strap thereon. In some embodiments, the body includes an anchor on an underside portion for attachment of an anti-sway component.

In other embodiments, there is disclosed a bicycle rack having at least one arm extendible in a rearward direction when the rack is installed on a vehicle, the arm having a cradle inserted onto the arm for receiving a bicycle portion thereon, the cradle including a longitudinal body having a through-hole extending through the longitudinal length of the body, the through-hole being sized to be received by a support assembly (for example, the arm of a bicycle rack), a saddle extending along a length of the longitudinal body, being positioned above the through-hole and having a top surface for receiving a tube of a bicycle, a latch at each end of the saddle for attachment of a strap thereto, the saddle being rotated such that the top surface of the saddle increases in dimension on one side of a vertical axis of the through-hole and decreases in dimension on the other side of the vertical axis as the saddle extends toward each end of the longitudinal body, wherein the latches are positioned on opposite sides of the vertical axis.

BRIEF DESCRIPTION OF THE DRAWINGS

A bicycle rack cradle according to the present disclosure is described with reference to the following figures, in which.

DETAILED DESCRIPTION

While the present technology may be embodied in many different forms, a number of illustrative embodiments are described herein with the understanding that the present disclosure is to be considered as exemplary of the principles of the technology and such examples are not intended to limit the technology to preferred embodiments described herein and/or illustrated herein.

Figure 1:
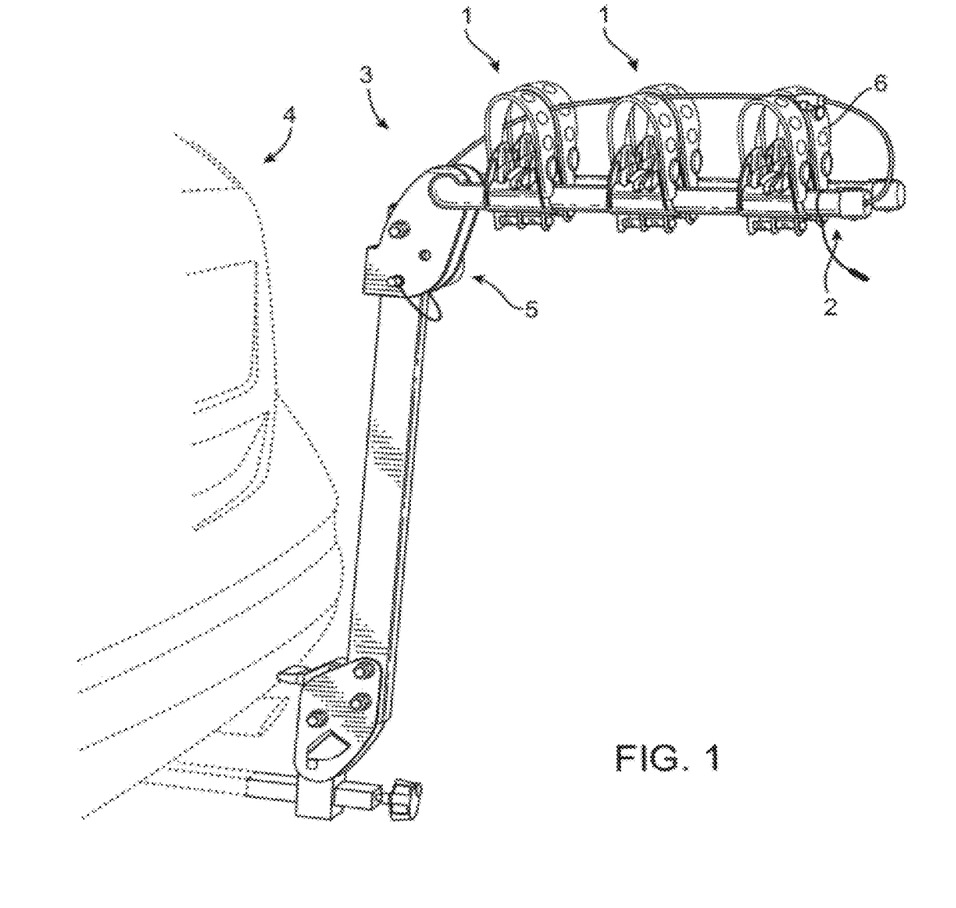
FIG. 1 is a perspective view of one embodiment of a bicycle carrier with a cradle.

Referring to FIG. 1, one exemplary embodiment of a cross oriented cradle 1 is shown installed onto the arms 2 of a bicycle rack 3 mounted at the rear of vehicle 4. The rear mounted bicycle rack 3 in the figure shown is hitch-mounted, however, other suitable racks may be employed including trunk mounted racks and roof mounted racks as are known in the art. In the embodiment shown in FIG. 1, the bicycle rack has two arms extending from a frame 5 which are capable of holding multiple cradles, with three cradles shown in the depicted embodiment. Generally, a bicycle can be placed on top of the cradles 1 perpendicular to the direction of the arms 2. Once laid thereon, straps 6 can then be pulled over the bicycle tube for securing the bicycle thereon.

Figure 2:
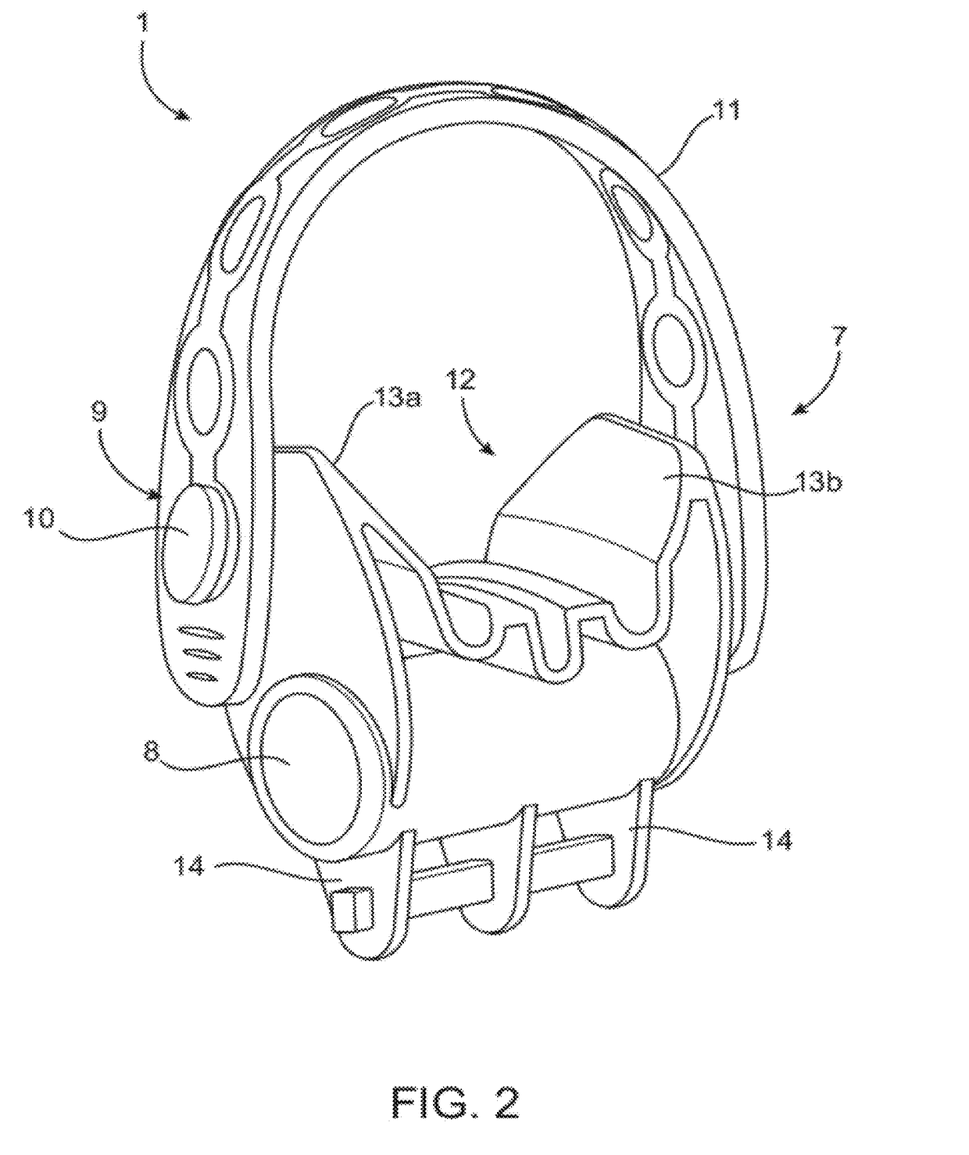
FIG. 2 is a perspective view of one embodiment of a cradle according to the present disclosure.

Referring now to FIG. 2, there is shown a perspective view of cradle 1 of the present disclosure. The cradle is comprised of a body 7, which when installed on the bicycle rack arm extends in the same longitudinal direction of the arm. The body 7 can be formed of a hard plastic, metal, composite or hard rubber material. The body 7 has a through-hole 8 passing through the longitudinal length of body 7. The through-hole 8 is sized to be received by a support assembly. For example, the support assembly can be a bicycle rack arm, a load carrier assembly, a support member of a bicycle, a support member of a rack, a support member of a load carrier assembly, or any other support assembly. The through-hole 8 can be generally circular, elliptical or a closed curve shape. In the depicted embodiment, the through-hole 8 is circular; however, in other embodiments, the shape of the through-hole will depend largely on the shape and design of the bicycle rack arm which it will be installed upon. Preferably the cradle 1 will have a tight or snug fit on the bicycle rack arm.

Also shown in FIG. 2 is a latch 9 provided on an end of the cradle 1. In the illustrated embodiment, a latch 9 is provided on each end of the cradle 1. The latches 9 can project from the exterior sides of the cradle 1 in the same general longitudinal direction. At the end of the latches is a latch flange 10 for attachment and securement of a strap thereon. A strap 11 is shown having a plurality of apertures shaped for receiving the latches 9. The plurality of holes on the strap 11 allow for adjustment of the tightness and length of the strap to be pulled over a bicycle tube installed in the cradle 1. Accordingly, bicycle tubes of varying sizes may be accommodated. The strap 11 is made up of a flexible elastomeric material such as natural or synthetic rubber. In some embodiments, the strap 11, while flexible, is firm enough to remain vertically upright when only one end is attached.

Between the latches 9 and located above the through-hole 8 can be a saddle 12. The saddle 12 has a concave shape to facilitate embracing a bicycle tube which is generally circular or elliptical in shape. Additionally, the saddle 12 is generally made up of a softer material than the remainder of the cradle in order to avoid causing any damage to a bicycle. Accordingly, such material can include a soft rubber material, soft polymer, foam, or the like. At either end of the saddle 12 are saddle end walls 13a and 13b which project upward upon which the latches 9 are attached. Accordingly, a bicycle tube can fit on top of the saddle and a strap drawn across being attached at the latches at either end for securement of the bicycle.

Further illustrated is an anti-sway anchor 14 upon which an anti-sway component may be attached for preventing sway of a bicycle installed on the carrier. Anti-sway components include those having a portion projecting downward and shaped to receive a downtube of a bicycle, thus preventing a "rocking" action of a bicycle when the vehicle is in motion. Although in the embodiment shown, the anti-sway anchor is comprised of an underhanging rod onto which an anti-sway member can be clasped, there are a variety of anti-sway anchors or connection points which may be employed. For example, the anti-sway anchor could be comprised of a fin, upon which an anti-sway member having a reciprocal aperture for receiving such fin along with arms with clasp the bicycle rack arm on either side of the cradle 1. Such anti-sway members are disclosed for example in U.S. application Ser. No. 12/888,341.

Figure 3:
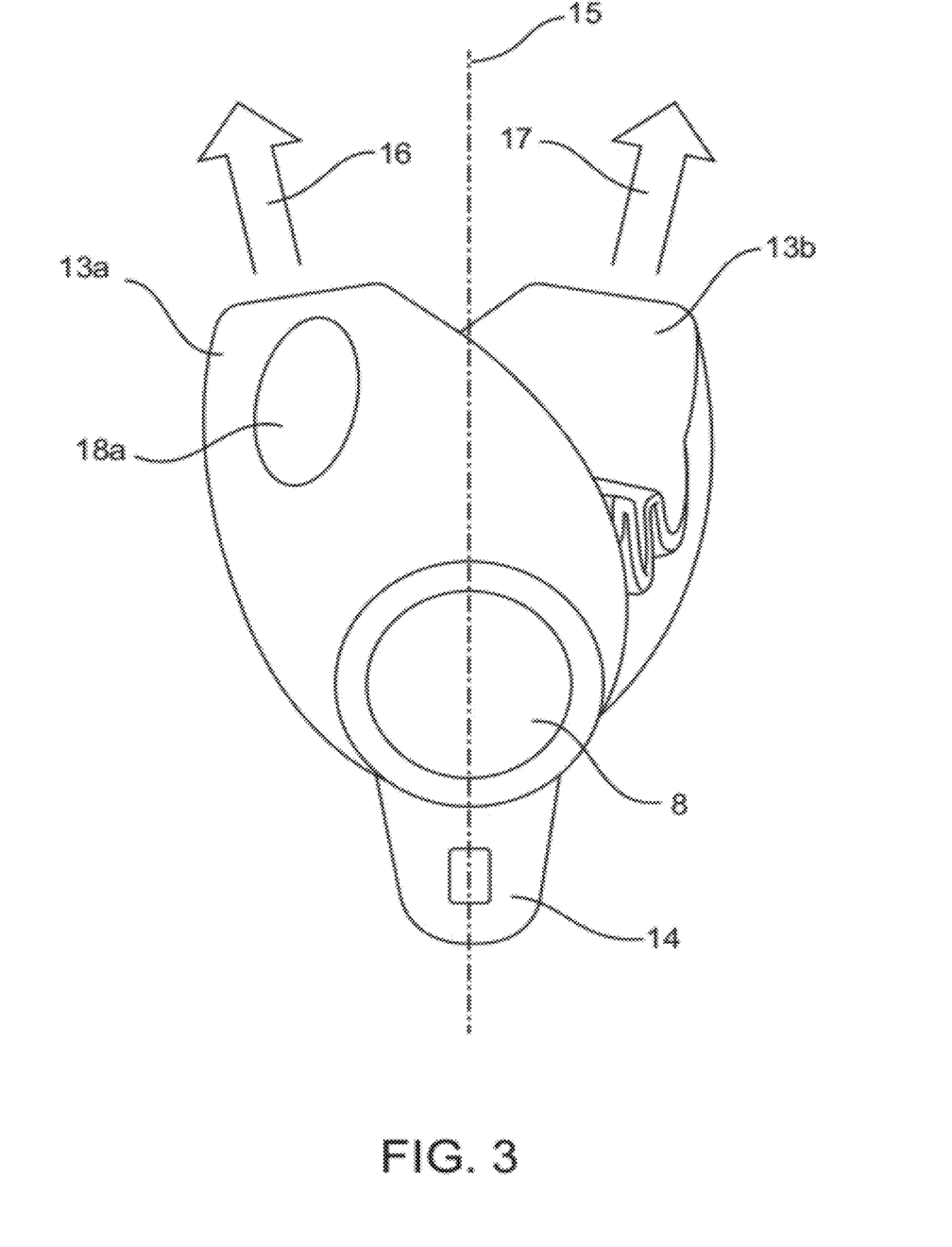
FIG. 3 is a front side elevational view of one embodiment of a cradle according to the present disclosure.

As illustrated in FIG. 2, the saddle 12 can be oriented cross-ways with respect to the longitudinal direction of the cradle 1 and bicycle arm. Cross-ways is defined herein as being not parallel but at an angle to the direction or line of reference. Accordingly, for purposes of the present disclosure, an orientation that is diagonal, oblique or at a right angle can all be considered "cross-ways." One embodiment is illustrated in FIG. 3, wherein a front view of the cradle 1 is shown. As shown, the through-hole 8 passes through the longitudinal direction of the cradle 1. Furthermore, saddle end walls 13a and 13b can be positioned at either end of the saddle 12.

Drawn as a reference, vertical axis 15 extends vertically through the central axis of the through-hole 8. It can be seen that the saddle extends cross-ways to the vertical axis 15. As shown, saddle end wall 13a is rotated counter-clockwise and extends away from the vertical axis 15 as shown by arrow 16. At the opposite end of the saddle 12, saddle end wall 13b is rotated clockwise and extends away from vertical axis 15 in a direction opposite that of saddle end wall 13a as shown by arrow 17. Accordingly, it can be seen that saddle end wall 13a extends on one side of the vertical axis 15 whereas saddle end wall 13b extends on the opposite side of the vertical axis 15. In the embodiment shown in FIG. 3, these saddle end walls 13a and 13b extend away from the vertical axis 15 to the same degree on either side of the vertical axis 15. For example, if saddle end wall 13b is rotated clockwise and extends away from the axis 14 by thirty (30) degrees, then saddle end wall 13a is rotated counter-clockwise and extends away from the axis 14 also by negative thirty (−30) degrees. Such degrees can be positive or negative (+/−) and can be anywhere from greater than zero (0) degrees to ninety (90) degrees, including 10, 20, 30, 45, 60, or 75 degrees, for example.

The position of the saddle end walls can also be described such that saddle end wall 13a is provided with a portion having greater surface area on one side of the vertical axis 15 while the saddle end wall 13b has portion having a greater surface area on the opposite side of vertical axis 15. In this way, a saddle 12 would lie cross-ways from an end wall 13a to the other end wall 13b. Preferably, the saddle end walls 13a and 13b are equally spaced from one another about the vertical axis. As the saddle 12 extends between these saddle end walls, the saddle 12 lies cross-ways or oblique to the vertical axis 15.

In other embodiments, the rotation or extension of the saddle end walls 13a and 13b can be switched such that saddle end wall 13b extends counter-clockwise and saddle end wall 13a extends clockwise with respect to the vertical axis 15. Accordingly, the saddle 12 would extend in the opposite direction shown in FIG. 2 between the two saddle end walls 13a and 13b.

In the embodiment shown in FIG. 3, the saddle end walls 13a and 13b are rotated or extended in their respective directions to the same degree on either side of the vertical axis 15. For example, if the front side of the cradle 1 as depicted in FIG. 3 is viewed with reference to the face of a clock, saddle end wall 13a would be approximately extending in the ten o'clock area, while saddle end wall 13b extends at about the two o'clock area. Therefore, the saddle end walls 13b and 13a accordingly extend approximately the same degree in opposite directions of vertical axis 15. Therefore, from a front view looking straight upon the cradle 11, the two saddle end walls 13a and 13b form a V-shape.

Figure 4:
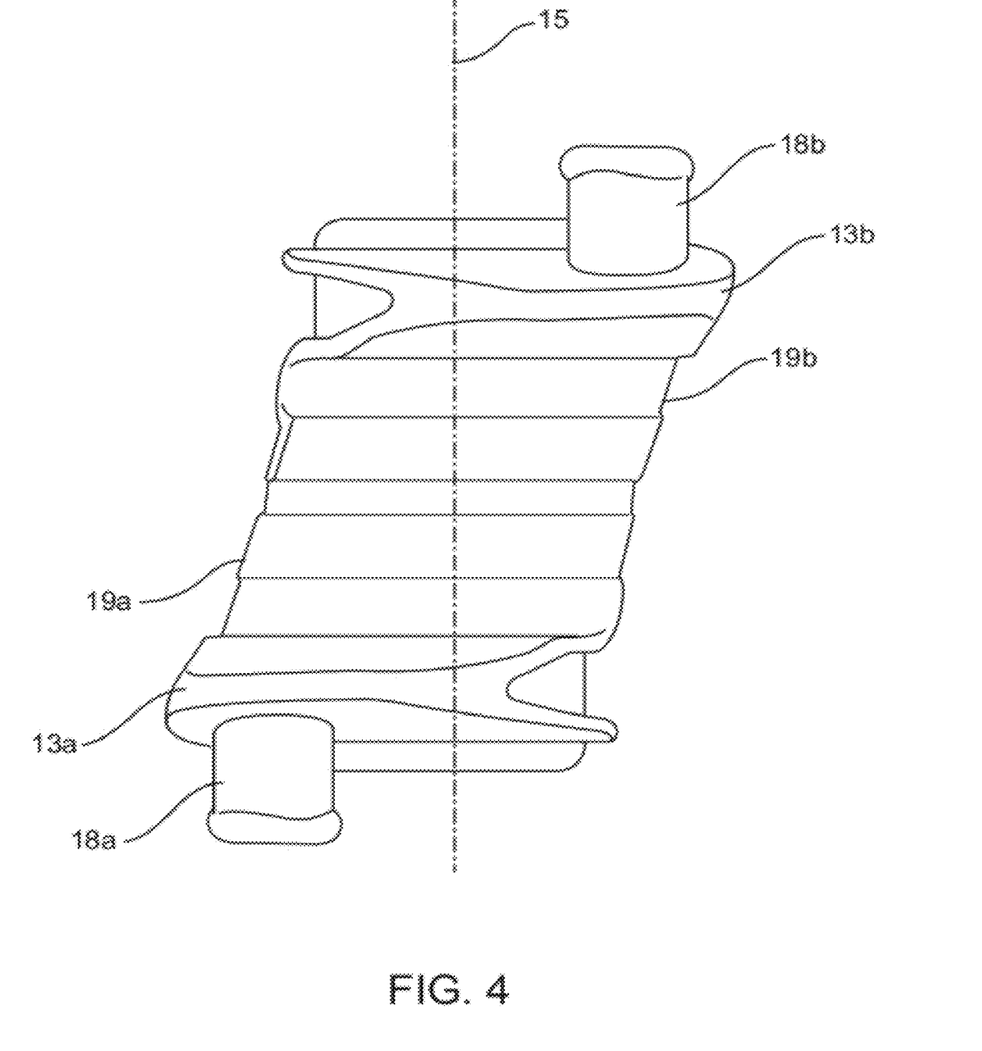
FIG. 4 is a top plan view of one embodiment of a cradle according to the present disclosure.
Figure 5:
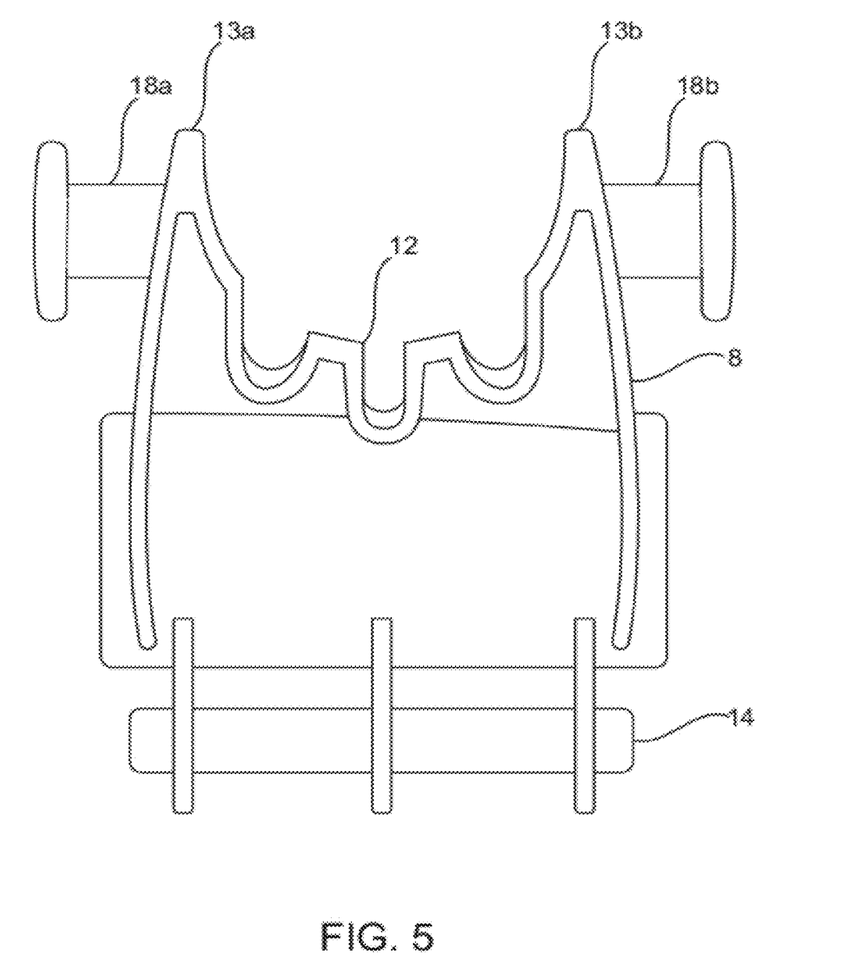
FIG. 5 is a side elevational view of one embodiment of a cradle according to the present disclosure.
Figure 6:
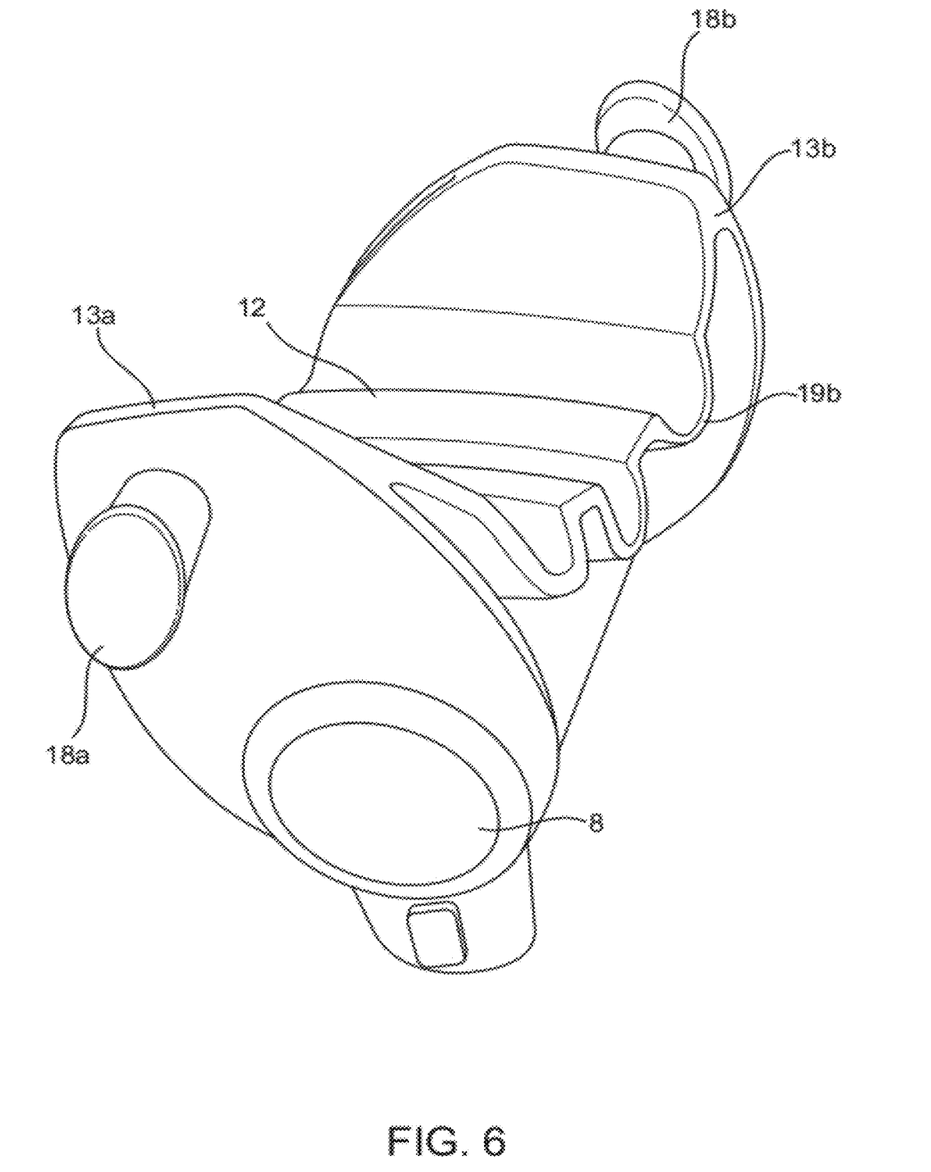
FIG. 6 is a perspective view of one embodiment of a cradle according to the present disclosure.

Also shown is latch 18a attached to saddle end wall 13a. In the embodiment shown, the latch flange 10 has an elliptical shape which is oriented such that the top portion is oriented to extend toward the vertical axis 15. Referring to FIGS. 4, 5, and 6, on the other saddle end wall 13b, another latch 18b (not shown in FIG. 3) is positioned on the opposite side of the vertical axis 15 with the top portion extending or rotated toward the vertical axis 15 to the same degree as the latch 18a. Such latches 9 can be oriented such that each is on opposite sides of the vertical axis 15. Further, in the embodiment shown, each latch 9 is an equal distance from the vertical axis 15.

Accordingly as illustrated in FIG. 3, when the strap (not shown) is attached to the latches 18a and 18b, due to the orientation of these latches 18a and 18b, along with the orientation of the saddle 12 and saddle end walls 13a and 13b, the strap (not shown) will have one end extending on one side of the bicycle rack arm and will have the other end of the strap extending on the opposite side of the bicycle rack arm.

An overhead view of the cradle 1 is shown in FIG. 4 to illustrate the position and orientation of the saddle 12. Saddle end walls 13a and 13b are shown on either end of the saddle 12 extending between latches 18a and 18b. A vertical axis 15 is also illustrated. In this view, the vertical axis 15 is coincident with a line extending along the longitudinal axis of the through-hole of the cradle 1. Moreover, as the longitudinal direction of the through hole (not shown) extends along a longitudinal length of a bicycle rack arm, such can also be referred to as the longitudinal axis of the bicycle arm. In some embodiments, the cradle 1 may be integrated with bicycle arm. In such embodiments, the cradle 1 does not have a true through-hole as the cradle 1 can be part of the bicycle rack arm. For example, the cradle 1 can be integrated with the bicycle rack arm. In such embodiments, the saddle 12 can be oriented cross-ways to the longitudinal direction or longitudinal axis of the bicycle arm. Furthermore, the saddle ends could be located on either side of the vertical axis or a center reference point.

Figure 7:
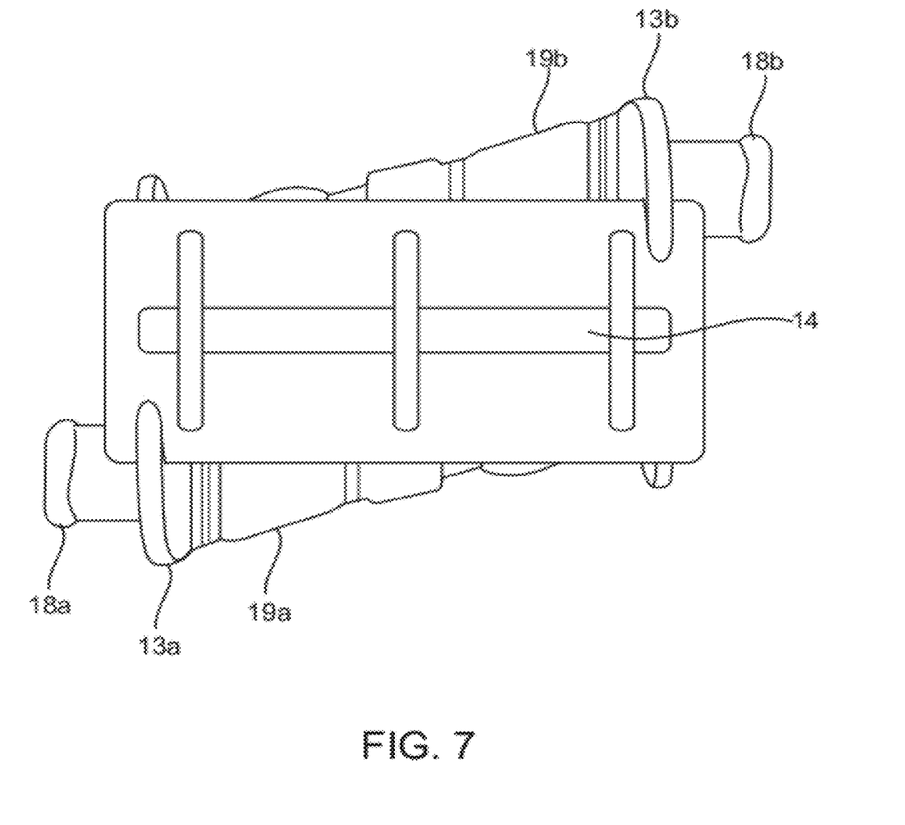
FIG. 7 is a bottom plan view of one embodiment of a cradle according to the present disclosure.

As can be seen in FIGS. 4 and 7, while extending in each direction, the saddle increases in dimension on one side of the vertical axis 15, while at the same time decreasing dimension on the other side of the vertical axis 15. For example, on the left side of the vertical axis 15 (i.e. longitudinal axis of the through-hole), the dimensional portion 19a or area of saddle 13 increases in size as it extends from saddle end 13b to saddle end 13a. However, on the right side of the vertical axis 15, the dimensional portion 19b or area of saddle 13 increases in the opposite direction, from saddle end wall 13a to saddle end wall 13b. Accordingly, toward saddle end wall 13a, the left side of the vertical axis 15 has a larger dimensional proportion of the saddle than the right side of the saddle proximate to saddle end wall 13a. Similarly toward saddle end 13b, the right side of the vertical axis 15 has a larger dimensional proportion of the saddle than the left side of the saddle proximate to saddle end 13b. Additionally, in the embodiment shown, these increase in size to the same degree on either side of the vertical axis 15. In this way, the saddle will be oriented cross-wise extending between the saddle ends.

In addition to the above, the saddle end wall 13a has a greater area, or in other words, has a greater size, on the left side of the vertical axis 15, while saddle end wall 13b has a greater area on the right side of the vertical axis 15. Thus, on either side of the axis, as the saddle 13 increases in size on one side of the axis, the saddle will increase toward the saddle end with the larger area on the same side of the axis.

Moreover, although in the illustrated embodiments, the sides of the saddle extend cross-wise to the vertical axis 15 of the through-hole and longitudinal axis of a bicycle rack arm, the sides of saddle 12 can extend parallel to one another as they extend between saddle ends.

Accordingly, for use of the cradle 1, a user may place a bicycle on the saddle 12 and then attach a strap 11 on the latches 18a and 18b. Due to the cross-wise orientation of the saddle 12, the ends of the strap 11 will not be obstructed by the bicycle rack arm, but will have either end extending on opposite sides of the bicycle rack arm and though-hole.

What is claimed is:

1. A cross-oriented cradle comprising:
   a longitudinal body comprising a through-hole extending through the longitudinal length of said body, said through-hole being sized to be received by a support assembly,
   a saddle extending along a length of said longitudinal body, being positioned above said through-hole and having a top surface that is concave about a first axis that is perpendicular to the longitudinal axis of the through-hole,
   a pair of latches, each latch of the pair disposed at an opposite end of said saddle for attachment of a strap thereto, said latches being positioned on opposite sides of the longitudinal axis of said through hole;
   wherein said ends of said saddle each have a greater area on one side of said longitudinal axis;
   wherein said greater area of each saddle end is on opposite sides of said longitudinal axis from one another and on opposite sides of the first axis from one another.

2. A bicycle rack cradle as claimed in claim 1, wherein said latches at each end of said saddle are positioned an equal distance on either side of said longitudinal axis.

3. A bicycle rack cradle as claimed in claim 1, wherein a dimensional portion of said saddle surface increases on opposite sides of said longitudinal axis toward each end of said saddle.

4. A non-linear bicycle rack cradle for receiving and securement of a portion of a bicycle thereon, said cradle comprising:

a longitudinal body comprising a through-hole extending through the longitudinal length of said body, said through-hole being sized to be received by a support assembly, a saddle extending along a length of said longitudinal body, being positioned above said through-hole and having a top surface located opposite the longitudinal body from the through-hole, a latch at each end of said saddle for attachment of a strap thereto, the top surface being located between the latches, said saddle being oriented such that the top surface of said saddle increases in dimension on one side of the longitudinal axis of said through-hole as the saddle extends towards the latch on that side of the longitudinal axis and decreases in dimension on the other side of said longitudinal axis as said saddle extends away from the latch on that side of the longitudinal axis, wherein said latches are positioned on opposite sides of said longitudinal axis and opposite sides of the top surface.

5. A bicycle rack cradle as claimed in claim 4, wherein said saddle surface increases in dimension on opposite sides of said longitudinal axis of said through hole toward opposite ends of said saddle.

6. A bicycle rack cradle as claimed in claim 5, wherein said saddle surface increases in dimension equally on opposite sides of said longitudinal axis of said through hole toward opposite ends of said saddle.

7. A bicycle rack cradle as claimed in claim 4, wherein said saddle surface increases in dimension on one side of said longitudinal axis of said through hole toward a saddle end having a greater area on the same side of said longitudinal axis of said through hole.

8. A bicycle rack cradle as claimed in claim 4, wherein each saddle end extension extends in a direction away from said longitudinal axis of said through hole.

9. A bicycle rack cradle as claimed in claim 4, wherein said latches at each end of said saddle are positioned an equal distance on either side of said longitudinal axis of said through hole.

10. A bicycle rack cradle as claimed in claim 1, wherein said latches are rotated in a direction toward said longitudinal axis of said through hole thereby facilitating attachment of a strap at each end of said saddle.

11. A bicycle rack cradle as claimed in claim 1, wherein said latches are comprised of extensions in the longitudinal direction of the body having a flanged end piece for resistantly fitting a hole of a strap thereon.

12. A bicycle rack cradle as claimed in claim 1, wherein said body comprises an anchor on an underside portion for attachment of an anti-sway component.

13. A bicycle rack having at least one arm extendible in a rearward direction when rack is installed on a vehicle, said arm having a cradle inserted on said arm for receiving a bicycle portion thereon, said cradle comprising:

a longitudinal body comprising a through-hole extending through the longitudinal length of said body, said through-hole being sized to be received by a support assembly, a saddle extending along a length of said longitudinal body, being positioned above said through-hole and having a top surface located opposite the longitudinal body form the through-hole, a latch at each end of said saddle for attachment of a strap thereto, the top surface being located between the latches, said saddle being oriented such that the top surface of said saddle increases in dimension on one side of the longitudinal axis of said through-hole and decreases in dimension on the other side of said vertical axis as said saddle extends toward each end of said longitudinal body, wherein said latches are positioned on opposite sides of said vertical axis and opposite sides of the top surface.

14. A bicycle rack cradle as claimed in claim 4, wherein said saddle surface increases in dimension on opposite sides of said longitudinal axis of said through hole toward opposite ends of said saddle.

15. A bicycle rack cradle as claimed in claim 5, wherein said saddle surface increases in dimension equally on opposite sides of said longitudinal axis of said through hole toward opposite ends of said saddle.

16. A bicycle rack cradle as claimed in claim 4, wherein said saddle surface increases in dimension on one side of said longitudinal axis of said through hole toward a saddle end having a greater area on the same side of said longitudinal axis of said through hole.

17. A bicycle rack cradle as claimed in claim 4, wherein said latches at each end of said saddle are positioned an equal distance on either side of said longitudinal axis of said through hole.

18. A bicycle rack cradle as claimed in claim 1, wherein said body comprises an anchor on an underside portion for attachment of an anti-sway component.

\* \* \* \* \*